United States Patent [19]
Bergmann et al.

[11] Patent Number: 4,689,395
[45] Date of Patent: Aug. 25, 1987

[54] ANHYDROUS THERMOSETTING ADHESIVE/SEALANT COMPOSITION COMPRISING MERCAPTO TERMINATED POLYMER AND $MNO_2$ HARDENER

[75] Inventors: Franz-Josef Bergmann, Laudenbach; Lothar Hockenberger, Ludwigshafen; Peter Endruscheit, Weinheim; Ralf Paehler, Dannstadt-Schauerheim, all of Fed. Rep. of Germany

[73] Assignee: Ruetgerswerke Aktiengesellschaft, Frankfurt, Fed. Rep. of Germany

[21] Appl. No.: 828,430

[22] Filed: Feb. 11, 1986

[30] Foreign Application Priority Data

Mar. 14, 1985 [DE] Fed. Rep. of Germany ....... 3509175

[51] Int. Cl.$^4$ ............................................. C08G 75/04
[52] U.S. Cl. ..................................... 528/374; 528/375
[58] Field of Search ............................... 528/374, 375

[56] References Cited

U.S. PATENT DOCUMENTS

| | | | |
|---|---|---|---|
| 2,940,959 | 6/1960 | Rosenthal et al. | 528/374 |
| 3,282,902 | 11/1966 | Panek | 528/374 |
| 3,331,782 | 7/1967 | Deltieure | 528/374 |
| 3,491,046 | 1/1970 | Pachuta | 528/374 |
| 3,505,254 | 4/1970 | Kidwell et al. | 528/374 |
| 3,716,515 | 2/1973 | Wilhelm et al. | 528/374 |
| 4,104,189 | 8/1978 | Hertwig | 528/374 |

Primary Examiner—Harold D. Anderson
Attorney, Agent, or Firm—Beveridge, DeGrandi & Weilacher

[57] ABSTRACT

Anhydrous adhesives and sealants based on mercapto terminated polymers and/or oligomers and manganese (IV) oxide as the hardener are thermosetting if they contain only alkaline or neutral fillers and additives. The mixtures can be used for application with heating.

10 Claims, No Drawings

ANHYDROUS THERMOSETTING ADHESIVE/SEALANT COMPOSITION COMPRISING MERCAPTO TERMINATED POLYMER AND MNO₂ HARDENER

The invention relates to thermosetting adhesives and sealants based on mercapto terminated polymers and/or oligomers.

Compounds that can be extruded at room temperature and harden to form an elastic rubbery product play a major role in industrial seals and bonds in which the cemented bond or glued joint must be elastic.

Mercapto terminated polymers and oligomers, especially mercapto terminated polysulfide polymers and oligomers, are particularly suitable for many such technical seals and bonds because of their great elasticity, their excellent aging and chemical resistance, and because of their extremely low vapor permeability. Examples of such applications are seals between flexibly interconnected functional units, bondings of insulating glass panes, of front and rear windows in car bodies, or of difficult to bond sheets and sections on metal.

Heretofore, these adhesives and sealants were mainly used as so called two part systems in which the components containing the hardeners and the polymer or oligomer are stored separately and mixed together before use, or as moisture activated one part systems in which the mercapto terminated polymer and/or oligomer is premixed with a latent hardener, but the hardener becomes active only after exposure to moisture. However, because of the low moisture resistance of these polymers, said one part systems cure too slowly for all applications in which rapid bonding or rapid elastic sealing is important.

Another technical solution is offered by systems that can be applied when hot, such as disclosed in European Patent Nos. EP-A 6 698, EP-A 8845, EP-A 9297, and EP-A 73530. Here, too, the polymers and/or oligomers are premixed with a latent hardener which, however, is applied only when hot and causes an irreversible hardening.

All these systems use either pre-crosslinked compounds or systems with such giant molecules that the compounds cannot be applied at room temperature, but must be melted before use, then extruded when hot. To do this, these compounds must either be prefabricated as a solid strip, which is very expensive, or they must be melted in a storage tank. If the application process is interrupted, it will cause the line systems to clog, since hardening in a molten state is irreversible.

Therefore, a thermosetting material that can be pumped or extruded at room temperature would be desirable. Admittedly, hardening systems for mercapto terminated polymers and oligomers with zinc oxide, zinc peroxide, or p-quinone dioxime as hardening components are theoretically also suitable for hardening compounds that can be pumped and extruded at room temperature. However, in this case, the reaction time is too long for a technical application. Thus, sealants that can be pumped and extruded at room temperature and contain zinc peroxide or p-quinone dioxime as hardeners have a cure time of more than 60 min at 150° to 160° C. In order to reduce this long heating time, the so called hot melt compounds are selected for use in the above mentioned method.

It is impossible to reduce the cure time by increasing the cure temperature, since the polymers in these formulations can decompose. While European Patent No. A 9 297 discloses the heating of a corresponding pre-crosslinked strip with an extrusion gun at a temperature of about 210° C., in that case the compound is not heated to 210° C., but only to about 150° C. Also, this heat treatment lasts for such a short time that the thermal decomposition of the polymer can be disregarded.

With a more prolonged heat treatment, the heating temperature has a narrow upper limit. Thus, it is not possible to increase the cure rate by further elevation of temperature because of the thermal decomposition of the polymer backbone. The resulting compounds then lose their elasticity, depending on the extent of the thermal decomposition position. They become soft and pliable and can no longer function as adhesives and sealants.

Therefore, the present invention has as its object the provision of adhesives and sealants that are stable during storage and are based on mercapto terminated polymers and oligomers that can be pumped and extruded at room temperature and that enable a more rapid curing with application of heat than is possible in previously known systems of this type. Under certain conditions, the more rapid curing can be achieved by increasing the cure temperature, but to this end, it is necessary that the adhesives and sealants incorporating the invention be thermally more stable and exhibit a higher thermal load bearing capacity than the conventional thermosetting systems of this type.

In accordance with a feature of this invention there are provided thermosetting adhesive and/or sealant compositions based on one or more mercapto terminated polymers and/or oligomers with concurrent use of hardeners, fillers, plasticizers, drying agents and, as necessary, solvents, coupling agents, pigments, stabilizers, accelerators, thixotropic and retarding agents, wherein the compositions are essentially free of water and contain manganese IV oxide as the hardener. In these compositions, as fillers and additives, there may be employed only those substances whose aqueous suspension or aqueous extract is neutral or basic, with the exception of the retarding agents.

In a further aspect of the invention, there is provided a process for manufacturing thermosetting adhesive and/or sealant compositions wherein a mercapto terminated polymer and/or oligomer or mixture of said polymer and/or oligomer are thoroughly mixed under vacuum and dried in the process. One or more fillers, plasticizers, drying agents and, as necessary, solvents, coupling agents, pigments, stabilizers, accelerators, thixotropic and retarding agents may be mixed therewith. The water content of the composite mixture is less than 0.5 weight percent, usually a maximum of only 0.1 weight percent. Manganese (IV) oxide is predried until its water content is less than 0.05 weight percent and, together with a softening agent is made into a paste together with a drying agent. The paste, together with the mixture containing the polymer and/or oligomer are then blended with one another under vacuum to produce the desired composition wherein the water content is less than 0.1 weight percent.

A still further feature of the invention resides in one part, or single package, thermosetting adhesives and sealants based on the above described compositions and process.

The novel thermosetting adhesives and sealants embodying the invention correspond in their basic design to the moisture activated one part compounds with manganese (IV) oxide as the hardening component. Their formulation, however, differs from the known one part systems to the extent that the selection of the fillers and additives must be limited to neutral or basic; i.e. alkaline, substances.

This is unusual for one of ordinary skill in the art in that fillers for such compounds are always so selected that they complement and compensate for each other in their properties, be it in their reinforcing effect, lubricity, water absorption, as well as in their alkalinity or acidity. Thus, basic (alkaline) and acidic fillers have been used heretofore in combination to achieve optimum properties. The acidic fillers are necessary not only for optimizing the reinforcing property, but especially for the thixotropy of the compounds. A certain stability under load is expected of sealants when uncured, which can be achieved not only by the use of as finely divided fillers as possible, but also be the addition of thixotropic agents. Acidic fillers are necessary for the activity of these thixotropic agents, especially if the compounds are anhydrous.

The use of manganese (IV) oxide to produce moisture activated one part compounds based on polysulfide polymers is described in West German Application No. OS 25 57 088.

It is not known that such one part compounds can be cured by heat treatment. This is surprising, because moisture activated one part compounds based on polysulfide polymers or oligomers and other hardeners such as calcium or strontium peroxide, chromate or potassium permanganate cannot be cured by heat treatment. In the expert's opinion, water is also necessary for oxidative curing with heat.

It is likewise novel and surprising that not all one part compounds based on polysulfide polymers or oligomers and with manganese (IV) oxide as the hardener are suitable for curing by heat treatment, but that in this case one depends greatly on the formulation of these compounds, i.e., on the fillers and additives, and that especially those compounds are unsuitable that have a formulation which the average artisan would regard as unsuitable and thus would reject.

All liquid polymers or oligomers or mixtures of monomeric, oligomeric, and polymeric compounds with terminal mercapto groups, such as, for example, polysulfide polymers, polymeric thioethers, etc., are suitable for thermosetting adhesives and sealants. An example of a monomeric compound with only one SH group is 2-mercapto-ethanol, which is often added to polymers as a so called chain terminating agent to obtain greater flexibility of the cured end product. Other examples of such polymers and oligomers are known in the art.

The preferred liquid mercapto terminated compounds are polysulfide polymers and oligomers with the general formula HS—(RSS)$_n$—RSH in which n has a value ranging from 5 to 25 and R is an alkyl, alkylether, or alkylthioether group. Preferably, the alkyl group contains 1 to 4 carbons. The preferred R group is a bisethyl-formal group with the formula:

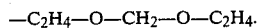

—C$_2$H$_4$—O—CH$_2$—O—C$_2$H$_4$—.

The molecular weight of these compounds is in the 500 to 8000 range, depending on the number n and on the size of the R group. These polysulfide compounds have a viscosity of 0.5 to 80 Pa's at room temperature.

The preferred types of manganese (IV) oxide are those that are available commercially as hardeners for polysulfide polymers. These are usually gamma- or delta-manganese (IV) oxide. This manganese (IV) oxide may contain up to 8 weight percent water. It is important that this water content be reduced to less than 0.1 weight percent before the manganese (IV) oxide is combined with other components of the compound.

The amount of manganese (IV) oxide used must be apportioned in such a way that all mercapto groups can be oxidatively cross-linked to disulfide bridges. Advantageously, 2 to 3 times the stoichiometrically necessary amount is used.

According to the invention, only such fillers and additives that are neutral or basic (alkaline) can be used. A measure of this acidity or alkalinity is the pH of a 10% aqueous solution or suspension in the case of fillers and solid additives of the pH of an aqueous solution or extraction in the case of liquid additives. If the pH of such a solution or suspension or of such an extract is greater than or equal to 7, the tested filler or additive can be used. The only exception are retarding agents, such as oleic, stearic, or benzoic acids or maleic or phthalic anhydrides, which are used in small amounts.

Examples of possible fillers are chalks, alkaline blacks, dolomite, titanium dioxide, zinc sulfide, heavy spar, cellulose or polyamide powder. Examples of possible solid additives are alkaline earth oxides or hydroxides, molecular sieve powder, sublimed sulfur, bentonite, and, as necessary, pigments, reaction accelerators or stabilizers. Examples of liquid additives are solvents, plasticizers, such as, for example, phthalates, benzoic acid esters, hydrated terphenyls or high boiling polyethers, coupling agents, or liquid stabilizers, drying agents, or sedimentation inhibitors.

The compounds are manufactured in such a way that at least two different parts are prepared separately and combined in the end. As a rule, the mercapto terminated polymer and/or oligomer is combined vigorously with softening agents, fillers, drying agents, pigments, thixotropic and retarding agents, and, if necessary, with solvents, coupling or accelerating agents, with exclusion of air, preferably in vacuum. Moreover, all substances used must be dry. Since inorganic fillers, many softening agents, as well as the mercapto terminated polymers or oligomers, always contain traces of water, the use of completely anhydrous products is impossible under industrial production conditions. The mixture may, however, have a maximum water content of only 0.1 weight percent. Therefore, the term "essentially water free" is used herein.

This is achieved sometimes by using predried charges with a water content of about 0.1 weight percent, sometimes by preparing this mixture with agitation under vacuum, during which, if necessary, the removal of water is facilitated by the prior addition of azeotropically distilling solvents such as toluene.

Since the mixtures also contain drying agents that react chemically with water such as, for example, alkali earth oxides or drying agents that actively absorb water such as, for example, molecular sieve powder, the water content of the storable mixtures is generally less than 0.05 weight percent.

Similarly, the manganese (IV) oxide, which has been dried in a drying kiln at 105°–120° C. or under vacuum, is mixed with drying agents, made into a paste with softening agents, and vigorously mixed. This manganese (IV) oxide paste is combined with the mixture containing the mercapto terminated polymer or oligomer and thoroughly mixed in vacuum.

Suitable mixers for this purpose are high speed anchor mixers, planetary mixers or dissolvers, which can operate in vaccum. The resulting compounds can be stored for months under dry conditions at temperatures up to 50° C. They are pumpable and extrudable at room temperature. With exposure to moisture, they cure within a few days; first, a thin nontacky film develops, which thickens until the mass is totally cured. Uniform total curing of the entire mass occurs with heating.

This thermosetting occurs at about 100° C. with cure times of about 60 min. With increasing temperature, the cure time decreases to about 5 min at an oven temperature of 230° C.

The mass can be heated by warming in an oven, by brief contact with hot surfaces, or by irradiation with infrared waves of microwaves, the latter having the advantage of uniformly heating the mass. In this case, it is unnecessary to heat the mass during the entire curing period. Rather, it is sufficient to heat the mass briefly to a temperature of 170° to 200° C. The mass cures completely during the cooling phase, which is prolonged by the released heat of the reaction. This type of curing is caused by another unexpected advantage of the compounds according to the invention in that they are thermally very stable, so that they can be heated to appropriate temperatures without demonstrable interference by decomposition reactions. Thus, it is possible to use these compounds at room temperature as pumpable adhesives and sealants that can be applied when hot.

The amounts of filler and/or additive substance used will vary depending upon the ultimate purpose of the final composition. Therefore, these substances will be used in a sufficient amount to yield a final product of the desired properties and utility as will be apparent to those skilled in the art.

The following examples are illustrative of the present invention.

The polymer used in Example 2 and in the comparison examples is a polysulfide polymer with the general structure:

$$HS-(C_2H_4-O-CH_2-OC_2H_4-SS)_8-C_2H_4-O-CH_2-O-C_2H_4SH$$

with about 0.5% cross-linkage. It has a mean molecular weight of 4000 and a viscosity of 35-45 Pa.s at 27° C. All amounts given refer to parts by weight of weight percent.

EXAMPLE 1

Technical grade manganese (IV) oxide for curing liquid polysulfides is dried at 110° C. for 24 hours.

A hardener mixture consisting of:
60 parts dry manganese (IV) oxide
90 parts benzylbutylphthalate
5 parts barium oxide powder
15 parts molecular sieve powder 3 A
is worked into a paste in a ball mill.

The paste has a water content of 0.02 weight %.

EXAMPLE 2

A stock mixture consisting of:
1000 parts polymer
370 parts benzylbutylphthalate
800 parts chalk
100 parts SRF black (pH 8)
250 parts titanium dioxide
5 parts stearic acid
25 parts molecular sieve powder 3 A
25 parts bentonite (Bentone SD-2)
5 parts barium oxide powder
is actively mixed in a planetary mixture for 40 min under vacuum (600 Pascal). The homogeneous mixture has a water content of 0.09%.

170 parts of the hardener mixture in Example 1 are added to this mixture and the final mixture is mixed vigorously under vacuum for 10 minutes.

The resulting mass is divided into several batches, which are used for the following tests:

a. One portion is stored in a sealed tube at 23° C. The mass is still extrudable after being stored for 6 months.

b. One part is extruded to form a sample (15×15×50 mm) and stored in the open at 23° and 50% relative humidity After 30 minutes the mass has a thin nontacky film. After one day, the film is 3 mm thick. After 10 days the sample has cured to an elastic rubbery body.

c. 50 g of the mass is stored in a forced air oven.

The corresponding cure times and the temperatures attained when the mass is cured are measured at the oven temperatures given in Table 1:

| Temperature/oven (°C.) | Temperature/mass (°C.) | Cure time (min) |
|---|---|---|
| 130 | 130 | 55 |
| 140 | 140 | 45 |
| 150 | 150 | 30 |
| 160 | 155 | 23 |
| 170 | 162 | 18 |
| 180 | 167 | 12 |
| 190 | 175 | 10 |
| 200 | 174 | 8 |
| 210 | 174 | 6 |
| 230 | 173 | 5 | d. 50 9 of the mass is heated in a microwave oven for 60 seconds at the highest setting. The temperature of the sample is then a constant 175° C. After cooling, the sample is cured to an elastic rubbery body.

e. A portion of the mass is extruded with a hot-melt gun, with the mass in the gun being briefly heated to 180° C. After the extruded strand has cooled, it is fully cured.

EXAMPLE 3

As in Example 2, a stock mixture is prepared, whereby the mercapto terminated compound used is an oligomeric polysulfide with the general structure:

$$HS-(C_2H_4-O-CH_2-O-C_2H_4-SS)_8-C_2H_4-O-CH_2-O-C_2H_4-SH$$

with about 2% cross-linkage. It has a mean molecular weight of 1000 and a viscosity of 0.7-1.2 Pa.s at 27° C.

680 parts of the hardener mixture in Example 1 are added to the stock mixture and the final mixture is vigorously mixed for 10 min in vacuum.

The resulting mass is divided into several batches, which are used for the following tests:

a. One portion is stored in a sealed tube at 23° C. The mass is still extrudable after being stored for 6 months.

b. One part is extruded to form a sample (15×15×50 mm) and stored in the open at 23° C. and 50% relative humidity. The mass has a thin nontacky film after 30 minutes. After 10 days the sample is cured to an elastic rubbery body.

EXAMPLE 4

As in Example 2, a stock mixture is prepared, the mercapto terminated compound used being a polymercaptan with the general structure:

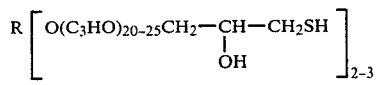

where R designates an aliphatic group. The polymer has a mean molecular weight of 6000 and a viscosity of 6 Pa.s at 25° C.

250 parts of the hardener mixture from Example 1 are added to this mixture, and the final mixture vigorously mixed for 10 min under vacuum.

The resulting mass is divided into several batches, which are used for the following tests:

a. One portion is stored in a sealed tube at 23° C. The mass is still extrudable after being stored for 4 months.

b. One part is extruded to form a sample (15×15×50 mm) and stored in the open at 23° C. and 50% relative humidity.

The mass has a thin nontacky film after 20 min. After 10 days the sample is cured to an elastic rubbery body.

c. 50 g of the mass is stored in a forced air oven at 160° C. After 25 minutes the mass has cured to an elastic rubbery product.

COMPARISON EXAMPLE 1

A stock mixture consisting of:
1000 parts polysulfide polymer
270 parts benzylbutylphthalate
100 parts chlorinated paraffin (56% chlorine) 600 parts chalk
300 parts calcined clay
250 parts titanium dioxide
5 parts SRF black (pH 8)
5 parts stearic acid
25 parts high dispersible silicic acid
25 parts molecular sieve powder 3 A
is prepared as in Example 2 and mixed vigorously with 170 parts of the hardener mixture in Example 1 under vacuum.

The resulting mass is divided into several batches, which are used for the following tests:

a. One portion is stored in a sealed tube at 23° C. The mass is still extrudable after being stored for 6 months.

b. One part is extruded to form a sample (15×15×50 mm) and stored in the open at 23° C. and 50% relative humidity.

The mass has a thin nontacky film after 1 hour. After 14 days the sample has cured to an elastic rubbery body.

c. 50 g of the mass is stored in a forced air oven at 160° C. No curing is observed after 60 minutes.

COMPARISON EXAMPLES 2 to 6

50 g of various one part compounds based on polysulfide polymers are stored in a forced air oven for 60 min at 160° C. The following results are obtained:

| Compound | Result |
| --- | --- |
| a. commercial one part compound with CaO$_2$ as hardener | no curing |
| b. commercial one part compound with ZnO$_2$ as hardener | some curing surface tacky due to decomposition products |
| c. one part compound according to Example 3 in DE-PS 26 15 963 | no curing |
| d. one part compound according to Example 2 in DE-OS 25 57 088 | no curing |
| e. one part compound according to Example 1 in DE-PS 23 63 856 | no curing |

Further variations and modifications of the foregoing will be apparent to those skilled in the art and are intended to be encompassed by the claims appended hereto.

The German priority application No. P 35 09 175.4 is relied on and incorporated by reference.

We claim:

1. A thermosetting adhesive/sealant composition which is a one component mixture that is stable in storage at room temperature and cures rapidly upon being subjected to elevated temperature comprising (i) one or more of a mercapto terminated polymer or oligomer, (ii) a hardener, and (iii) at least one additive which is a filler, plasticizer or drying agent, wherein the water content of the composition is less than 0.1 weight percent, said hardener is activated, dried MnO$_2$ (manganese IV oxide) wherein the water content of the manganese (IV) oxide is less than 0.05 weight percent and said filler, plasticizer or agent additive is selected so that an aqueous suspension or aqueous extract thereof is neutral or basic.

2. The thermosetting adhesive/sealant composition according to claim 1 wherein said polymer and oligomer are represented by the formula:

in which n has a value of 5 to 25 and R is an alkylene, alkylether or alkylthioether group.

3. The thermosetting adhesive/sealant composition according to claim 2 wherein R is:

4. The thermosetting adhesive/sealant composition according to claim 1 wherein said polymer and oligomer have a molecular weight in the range of 500 to 8000.

5. The thermosetting adhesive/sealant composition according to claim 1 wherein the amount of manganese (IV) oxide is sufficient to oxidatively crosslink all available mercapto groups to disulfide.

6. The thermosetting adhesive/sealant composition according to claim 5 wherein the amount of manganese (IV) oxide is 2 to 3 times the stoichiometric amount.

7. The thermosetting adhesive/sealant composition according to claim 1 wherein there is additionally present at least one substance which is a solvent, coupling agent, pigment, stabilizer, accelerator, thixotropic agent, retarding agent or mixture thereof, and except for the retarding agent, said substance is selected so that an aqueous suspension or aqueous extract thereof is neutral or basic.

8. A process for manufacturing a thermosetting adhesive/sealant composition wherein the water content is less than 0.1 weight percent and which is a one component mixture that is stable in storage at room temperature and cures rapidly upon being subjected to elevated temperature comprising mixing one or more of a mercapto terminated polymer or oligomer together with at least one addition which is a filler, plasticizer or drying agent under vacuum and simultaneously drying, until the water content of the resulting mixture is a maximum of only 0.1 weight Percent and, independently thereof, drying manganese (IV) oxide until its water content is less than 0.05 weight percent and, together with a softening agent, forming said manganese (IV) oxide into a paste, thereafter blending said paste with said resulting mixture containing the polymer or oligomer under vacuum to thereby obtain the desired composition, wherein said filler, plasticizer or agent is selected so that an aqueous suspension or aqueous extract thereof is neutral or basic.

9. The process of claim 8 wherein there is additionally added at least one substance which is a solvent, coupling agent, pigment, stabilizer, accelerator, thixotropic agent, retarding agent or mixture thereof and except for the retarding agent, said substance is selected so that an aqueous suspension or aqueous extract thereof is netural or basic.

10. The process of claim 8 wherein the said manganese (IV) oxide is formed into a paste with a softening agent and a drying agent.

* * * * *